No. 660,457. Patented Oct. 23, 1900.
E. R. POST & E. S. GRISE.
NUT LOCK.
(Application filed Feb. 20, 1900.)
(No Model.)

Witnesses
H. Joseph Doyle
May M. Olyer

Inventors
Edward R. Post, and
Edward S. Grise.
By Albert Popkins
Their Attorney

UNITED STATES PATENT OFFICE.

EDWARD R. POST AND EDWARD S. GRISE, OF OTTAWA, OHIO.

NUT-LOCK.

SPECIFICATION forming part of Letters Patent No. 660,457, dated October 23, 1900.

Application filed February 20, 1900. Serial No. 5,953. (No model.)

*To all whom it may concern:*

Be it known that we, EDWARD R. POST and EDWARD S. GRISE, citizens of the United States, residing at Ottawa, in the county of Putnam and State of Ohio, have invented certain new and useful Improvements in Nut-Locks; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in nut-locks of that class in which is employed a spring-fastener engaging in depressions or the like in the nut and washer to prevent its turning.

The present invention has for its object, among others, to provide an improved nut-lock of this class which shall be simple, yet efficient, and in which is employed a washer, adapted to be held in or to the fish-plate or other part, and a nut screwed upon the bolt and the two held against turning by a spring-bow fastener engaging in corresponding openings in the adjacent faces of the washer and nut. By this construction the washer can be readily applied upon the bolt and the nut then screwed up, avoiding the necessity of screwing up the one part, as heretofore.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1:
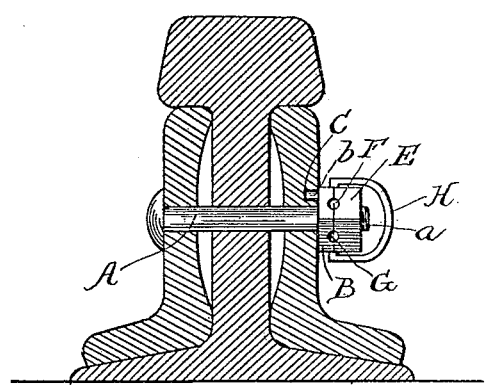
Figure 4:
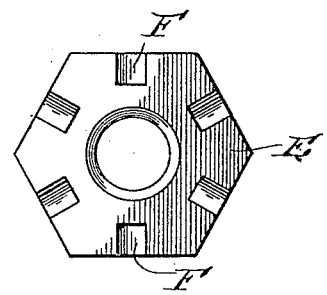
Figure 2:
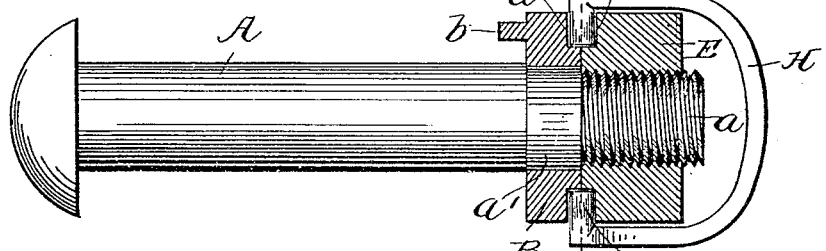
Figure 3:
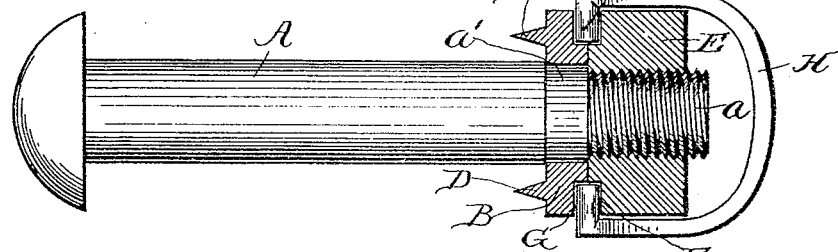
Figure 5:
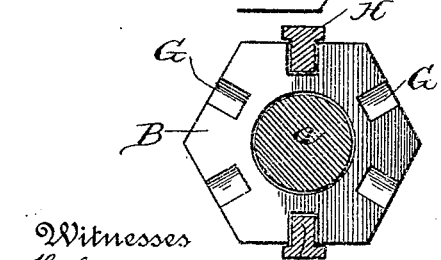
Figure 6:
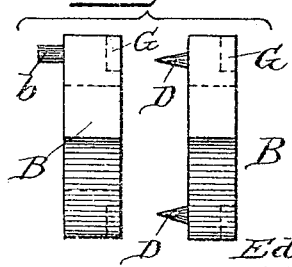

Figure 1 is a vertical transverse section showing the application of the invention to a railway-rail. Fig. 2 is an enlarged view of the bolt, nut, washer, and locking-bow, the nut and washer being shown in section. Fig. 3 is a view similar to Fig. 2, showing a form of washer adapted for use with wood. Fig 4 is a face view of the nut looking at the inner face thereof. Fig. 5 is a sectional view taken on line *x x* of Fig. 2 looking in the direction of the arrow. Fig. 6 is a side elevation of the two forms of washers used.

Like letters of reference indicate like parts throughout the several views.

Referring now to the details of the drawings by letter, A designates a bolt provided with screw-threads *a* and a shoulder *a'*.

B is a washer adapted to be slipped upon the bolt and to engage the said shoulder to limit its inward movement, as will be readily understood. This washer has a smooth unthreaded bore, so it may be easily slipped upon the bolt without the necessity of screwing the same thereon, and this washer is adapted to be held immovably to the part against which it contacts. When the improvement is to be used in connection with metallic parts—as, for instance, when employed in connection with railway-rails, in which case the washer will be held to the fish-plate—it is provided with a lug or projection *b*, as shown in Figs. 1 and 2, which is designed to engage in a hole or depression C in the fish-plate, so that when the said lug or projection is engaged in said hole or depression the washer is held immovably as regards the fish-plate. There may be more than one of these lugs or projections if desired, and the said lug or projection may be of any desired shape in cross-section.

When adapted for use in connection with wooden parts, the washer is formed with one or more points D, as seen in Fig. 3, which are designed to be pressed into the wood, where they serve the same function as the lug or projection in the form just described.

E is a nut. It, as well as the washer, may be of any desired shape about its periphery, preferably six-sided, although this is not essential. It is adapted to be screwed upon the bolt and is provided upon its inner face with a series of depressions F, as shown, which extend from the outer periphery to a point more or less removed or distant from the bore or passage through the nut, as seen clearly in the drawings, so that the ends of the locking device when in place cannot contact with the threads of the bolt. The adjacent face of the washer is provided with a series of like depressions G, as shown, and when the washer and nut are in position the openings therein will be coincident to form sockets in which are received the ends of the spring locking-bow now to be described. This bow *H* is in the form of a bow or yoke, as shown, and its ends extend inward to form the projections or points I, as seen clearly in Fig. 2.

The operation will be apparent from the foregoing description when taken in connection with the annexed drawings. When using the form of washer seen in Figs. 1 and 2, the washer is placed in position with its lug or projection in the opening in the fish-plate, and then the nut is screwed home. When in the desired position, the spring-bow is applied, the ends being sprung apart, so that projections thereof will enter the opposite openings or cavities in the washer or nut, when the resiliency of the bow will cause the same projections to spring into the said openings or cavities, and by this means the washer and nut will be locked, so that the nut cannot work loose. When using the form of washer with points, the screwing up of the nut will tend to force the points into the wood, and when the fastener is applied in the same manner as above the nut will be held against retrograde movement. The spring of the bow will permit of the movements occasioned by the vibrations or shock by the passing trains and will compensate therefor. The nut may be removed by simply springing one end of the bow out of the opening in which it has been engaged, when the bow may be removed and the nut free to be unscrewed, as will be readily understood.

What we claim as new is—

1. The combination with a bolt, of an unthreaded washer thereon, means for preventing revolution of said washer, a nut on the bolt and a spring-fastener having its ends turned inward toward each other and engaged in corresponding openings in the adjacent faces of diametrically-opposite sides of the said nut and washer to lock the nut against movement, as set forth.

2. The combination with a bolt, of a nut having depressions in its inner face, a washer having depressions in its outer face and upon its opposite face provided with means to prevent its turning and a spring-fastener engaged in the coincident openings in the nut and washer, as and for the purpose specified.

3. The combination with a bolt, of an unthreaded washer thereon, means for locking said washer against revolution, a nut engaging the threads of said bolt, said washer and nut having upon their adjacent faces corresponding openings extending toward the center, and a spring-bow having projections on its ends engaging in the openings in the nut and washer upon diametrically-opposite sides thereof, to lock them against movement, substantially as set forth.

In testimony whereof we affix our signatures in presence of two witnesses.

EDWARD R. POST.
EDWARD S. GRISE.

Witnesses:
JAMES P. LEUSURE,
DAVID N. POWELL.